Figure 1:
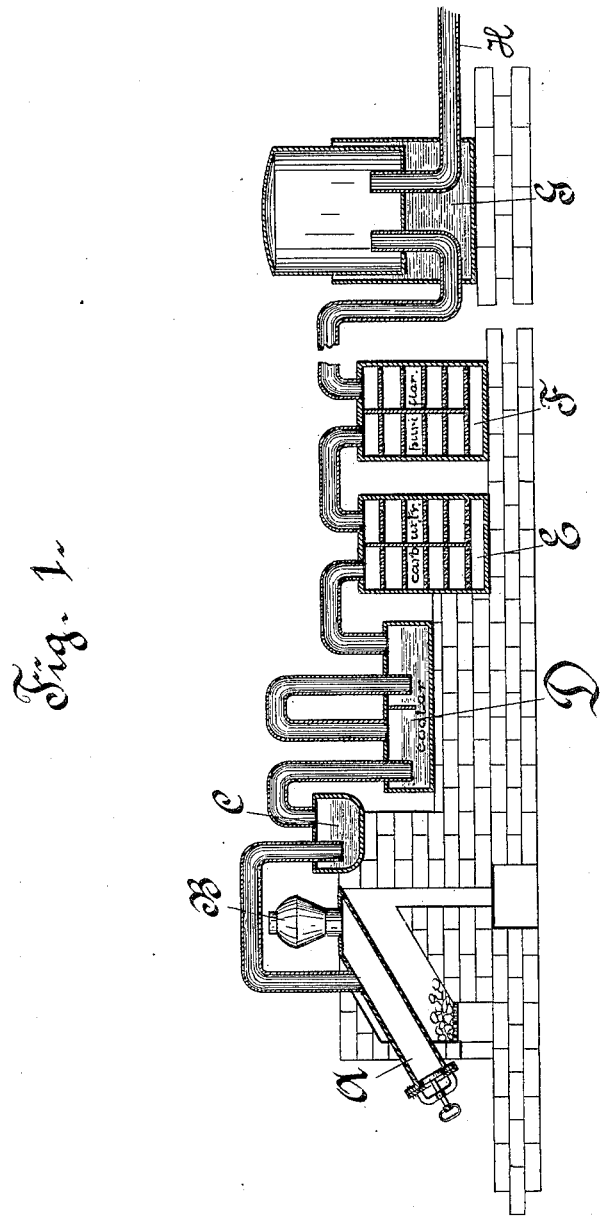

No. 649,749. Patented May 15, 1900.
E. PILOUS.
PROCESS OF MAKING GAS.
(Application filed Jan. 5, 1898.)
(No Model.) 2 Sheets—Sheet 1.

WITNESSES:
C. E. Holske
John Lotka

INVENTOR.
E. Pilous
BY Munn
ATTORNEYS.

No. 649,749. Patented May 15, 1900.
E. PILOUS.
PROCESS OF MAKING GAS.
(Application filed Jan. 5, 1898.)
(No Model.) 2 Sheets—Sheet 2.
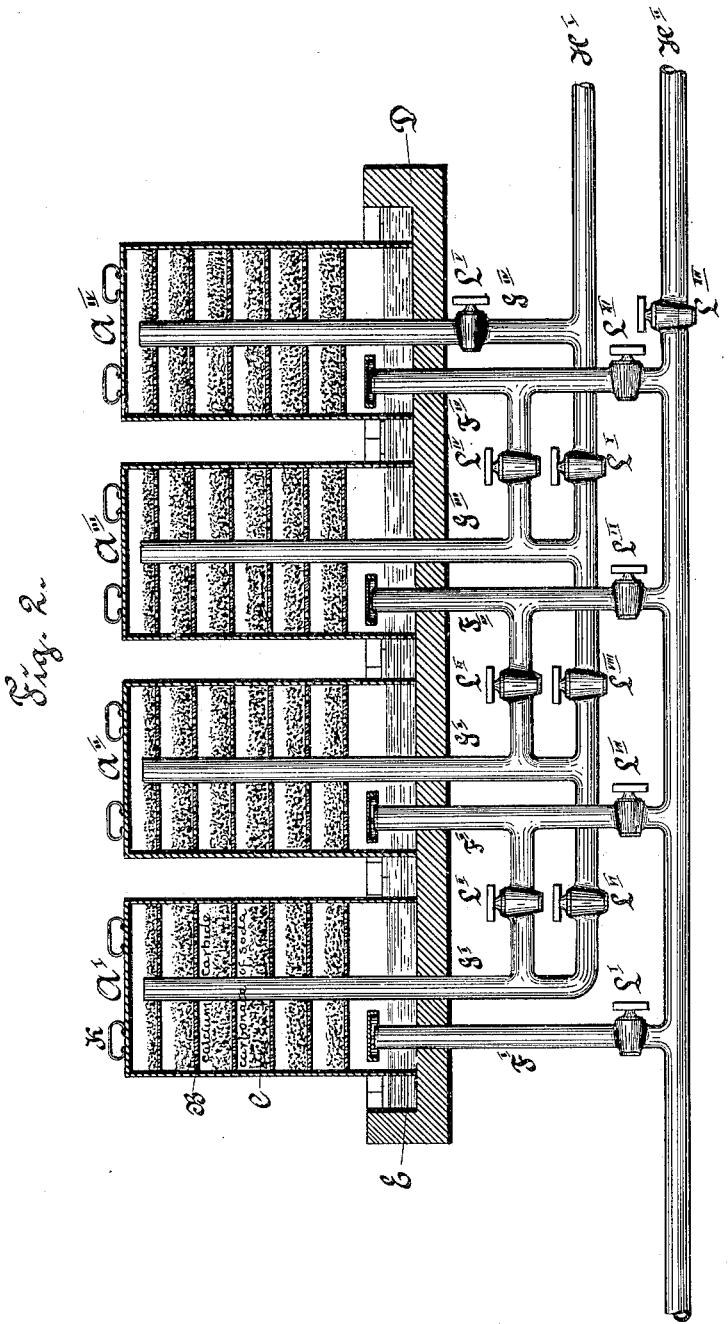
WITNESSES:
INVENTOR
ATTORNEYS.

UNITED STATES PATENT OFFICE.

EMIL PILOUS, OF VIENNA, AUSTRIA-HUNGARY, ASSIGNOR OF ONE-HALF TO G. OTTERMANN & CO., OF SAME PLACE.

PROCESS OF MAKING GAS.

SPECIFICATION forming part of Letters Patent No. 649,749, dated May 15, 1900.

Application filed January 5, 1898. Serial No. 665,684. (No specimens.)

*To all whom it may concern:*

Be it known that I, EMIL PILOUS, of Vienna, in the Empire of Austria-Hungary, have invented certain new and useful improvements in processes for the production of a white illuminating-gas by a new carbonizing process from sweepings of houses, markets, and streets, sewage, rubbish of petroleum-oil and wood, coal, and other organic materials fit for the production of gas; and I do hereby declare the following to be a full, clear, and exact description of the invention, such as will enable others skilled in the art to which it appertains to make and use the same.

Patents for this invention have been obtained in the following countries, the applications having been filed on the dates mentioned: Austria, No. 47/3,462, September 16, 1897; Germany, No. 100,239, September 23, 1897; Great Britain, No. 23,237, October 9, 1897; France, No. 271,182, October 11, 1897; Italy, No. 46,201, October 16, 1897; Hungary, No. 10,865, October 29, 1897, and Belgium, No. 133,335, January 22, 1898.

The object of this invention is to provide an improved process of manufacturing illuminating-gas.

According to my invention the gas is produced by the distillation of house, market, and street sweepings, drain and waste materials, petroleum-oil and wood refuse, coal, and other organic substances fit for making gas and conducted in a crude impure state through a carbureter which contains calcium-carbid salts, such as an alkali carbonate. In the first case (when the carbureter is filled with carbid alone) the steam present in the gas acts as a dissolving agent upon the carbid. In the second case the water of crystallization acting upon the calcium carbid generates acetylene gas, which mixes with the gas to be enriched. The illuminating power is obtained, however, not simply owing to the admixture of acetylene gas, but principally owing to the fact that the carbonic acid and pyropneumatic substances are removed from the gas to be enriched. By distilling refuse there is obtained a gas which is rich in carbonic acid and pyropneumatic substances. These substances seriously diminish the illuminating power of gas. When the gas passes through the carbureter, quicklime is formed, owing to the development of acetylene gas, and this quicklime combines with the carbonic acid of the refuse gas, forming carbonate of lime, and thus removing the carbonic acid from the refuse gas. Also from soda there will be formed bicarbonate of soda. Similarly the pyropneumatic substances are retained by chemical combination with the quicklime. The carbureter, therefore, also performs the office of a purifier. In many cases this purification suffices and there is no need of a second purifier or scrubber being used. The process of production is thereby materially cheapened and simplified. Beside the generation of acetylene gas and the removal of carbonic acid the carbureter may also accomplish the cooling of the gas, since it can be placed in a cooling-jacket and the chemical processes of purifying the gas and expelling the crystallized water absorb heat. Thus by one and the same operation there are accomplished simultaneously the enrichment of the gas by acetylene, an increase of illuminating power by the removal of carbonic acid, ($CO_2$,) purifying with lime, and partial cooling of the gas. Furthermore, the manufacture of gas is materially cheapened and simplified. The intrinsic worth of the invention consists, therefore, in these named remedies and in placing the carbureter between retorts and gas-reservoir, so that crude impure gas must pass through the carbureter. Of course after being treated according to my invention the gas may be further purified or dried according to any approved method or partly purified before entering the carbureter. The carbureter must be so constructed that large surfaces enable the gas to come in contact for a sufficient length of time with loose pieces of carbid or with the mixture of carbid and salts containing water of crystallization. The proportion of the mixture is variable. The greater the proportion of crystallized soda or salts containing water of crystallization the more rapid is the development of acetylene. The preferred mixture consists of three parts of calcium carbid and five parts of soda. An advantage of this carbureting process is that the carbid is fully utilized, while in ordinary generators the residue resulting from pouring water upon the carbid still contains a considerable amount of acetylene gas after its removal from the generator. The residuum of the carbureter consists of soda, lye of soda, (caustic soda,) carbonate of lime, and quicklime, as well as the sedimentary products of purification. After extraction by means of water and recrystallization the soda can be used again. It is self-evident that two or more carbureters can be set up in line and that the connection of one or more of such apparatus can be accomplished at will, so that the gas after partial admixture of acetylene in one carbureter can be conducted through a second active carbureter, and so on until any desired and stable percentage of carbureting is attained.

In the annexed drawings, Figure 1 is a sectional elevation of a complete plant for carrying out my invention, and Fig. 2 is a like view of the carbureter.

A is an obliquely-placed retort in which the refuse is gasified.

B is the feed-hopper, which is fitted with a double water seal.

C is the receiver; D, the gas-cooler; E, the carbureter; F, a purifier, (which may be omitted;) G, the reservoir, and H the service-pipe.

The carbureter is provided with plates, either pierced with holes or provided with sieves or hurdles, upon which is placed the carbid or the mixture of carbid and soda. If required, the gas passes also into the purifier F, which contains loose lime mixed with green copperas ($FeSO_4$)—iron sulfate. The gas is then conducted into the reservoir G and into the conduit H ready for consumption.

The carbureter, Fig. 2, consists of a series of receptacles $A^I$ $A^{II}$ $A^{III}$ $A^{IV}$, which may be connected with each other and with the generator by a series of communicating pipes $F^I$ to $F^{IV}$ and $G^I$ to $G^{IV}$, controlled by cocks $L^I$ to $L^{XII}$. The receptacles $A^I$ $A^{II}$ $A^{III}$ $A^{IV}$ are cylindrical, closed at the top and sides and open at the bottom, which dips into a tray D, containing water E to form a seal.

B' indicates a series of superposed perforated shelves located in the receptacles, and upon said shelves is placed the mixture of calcium carbid and some salt containing water of crystallization, such as carbonate of soda. The gas enters at J and may be caused to pass through one or more receptacles of the carbureter by closing cock $L^{XII}$ and opening one or more of the cocks $L^I$ $L^{VII}$ $L^{IX}$ $L^{XI}$ and the corresponding cocks $L^{VI}$ $L^{VIII}$ $L^X$ $L^V$. The carbureted gas then passes out at $H^I$. When no carbureting is desired, cocks $L^I$, $L^{VII}$, $L^{IX}$, and $L^{XI}$ are closed and cock $L^{XII}$ opened, the gas then passing out at $H^{II}$.

What I claim is—

The process of increasing the illuminating power of gases, which consists in carbureting the crude gases containing carbonic acid by bringing them in contact with calcium carbid, and at the same time removing the carbonic acid from the gas to be enriched.

In witness whereof I have hereunto set my hand in presence of two witnesses.

EMIL PILOUS.

Witnesses:
 HENRY C. CARPENTER,
 CHAS. E. CARPENTER.